Figure 1:
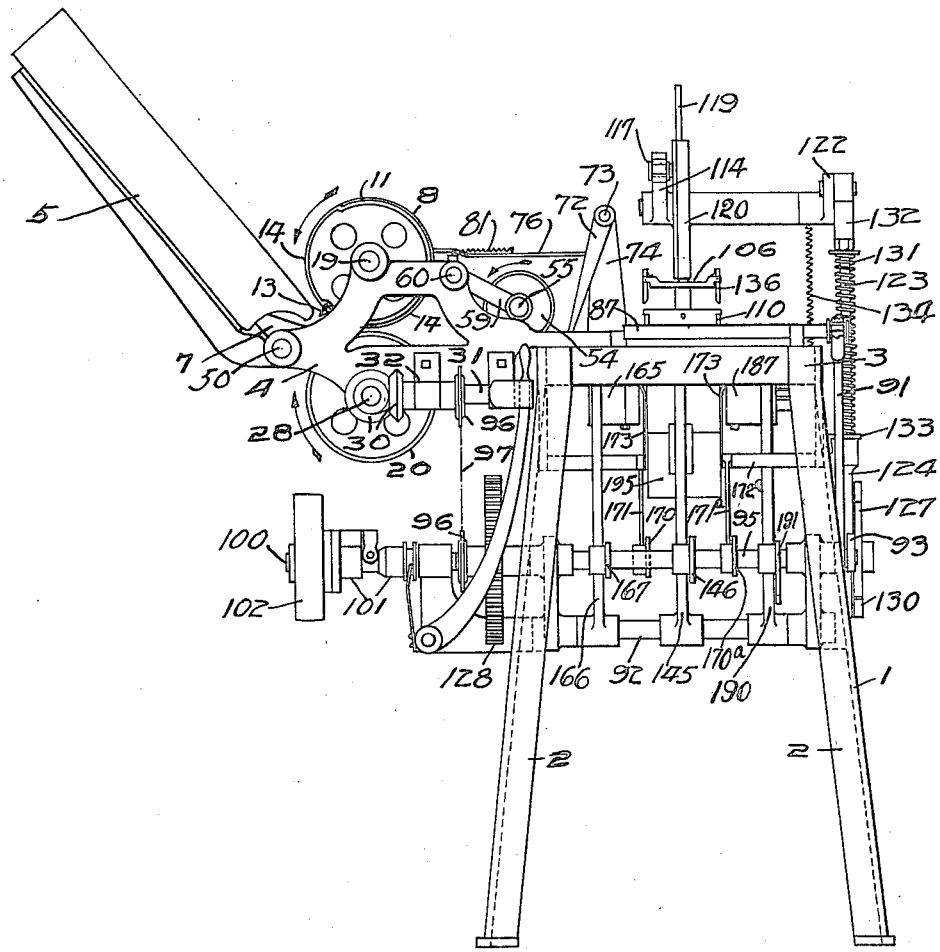

July 24, 1923.

F. E. BEAM

PACKAGE FORMING MACHINE

Filed Dec. 2, 1920

1,462,566

12 Sheets-Sheet 5

Inventor
Frank E. Beam
by
Owen, Owen & Crampton

July 24, 1923.

F. E. BEAM

PACKAGE FORMING MACHINE

Filed Dec. 2, 1920

1,462,566

12 Sheets-Sheet 6

Inventor
Frank E. Beam
by
Owen, Owen & Crampton

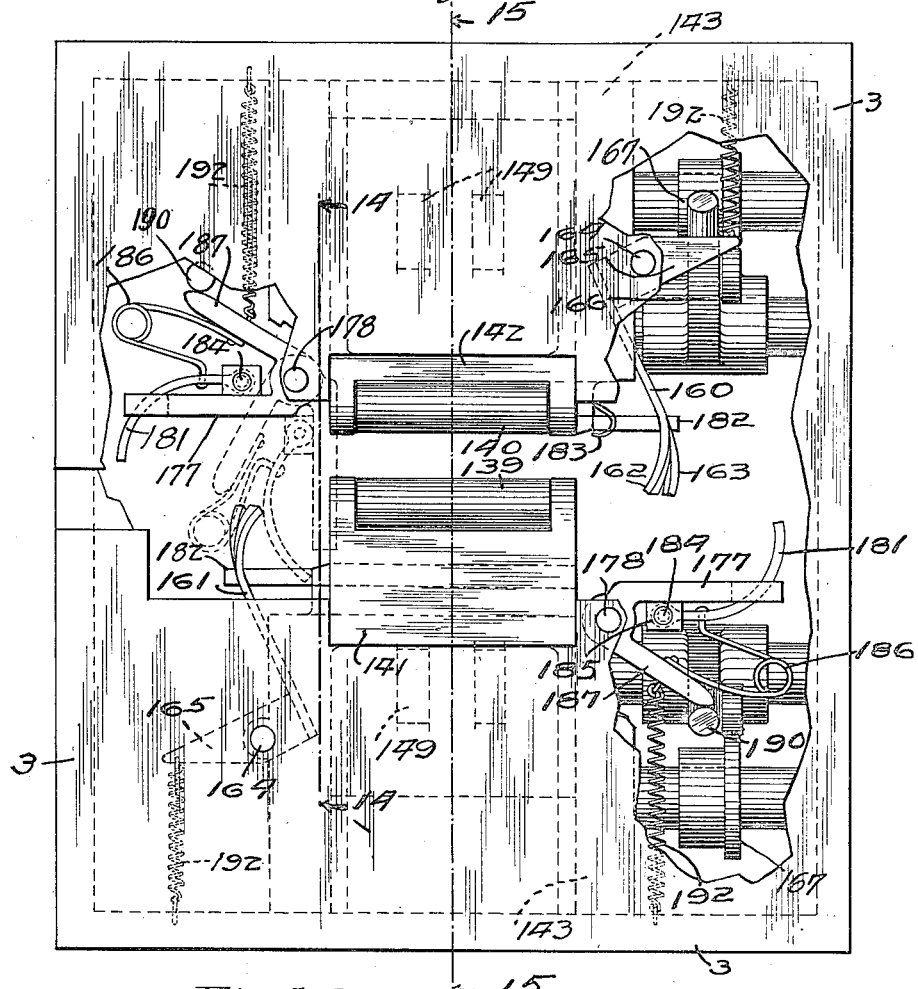
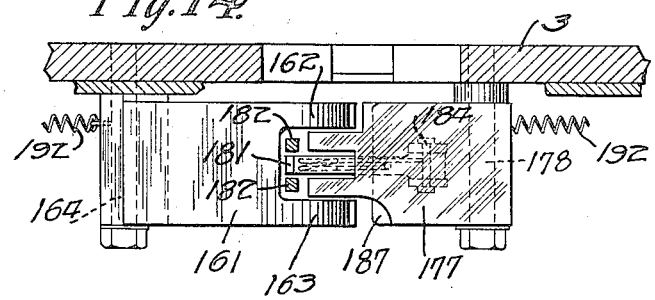

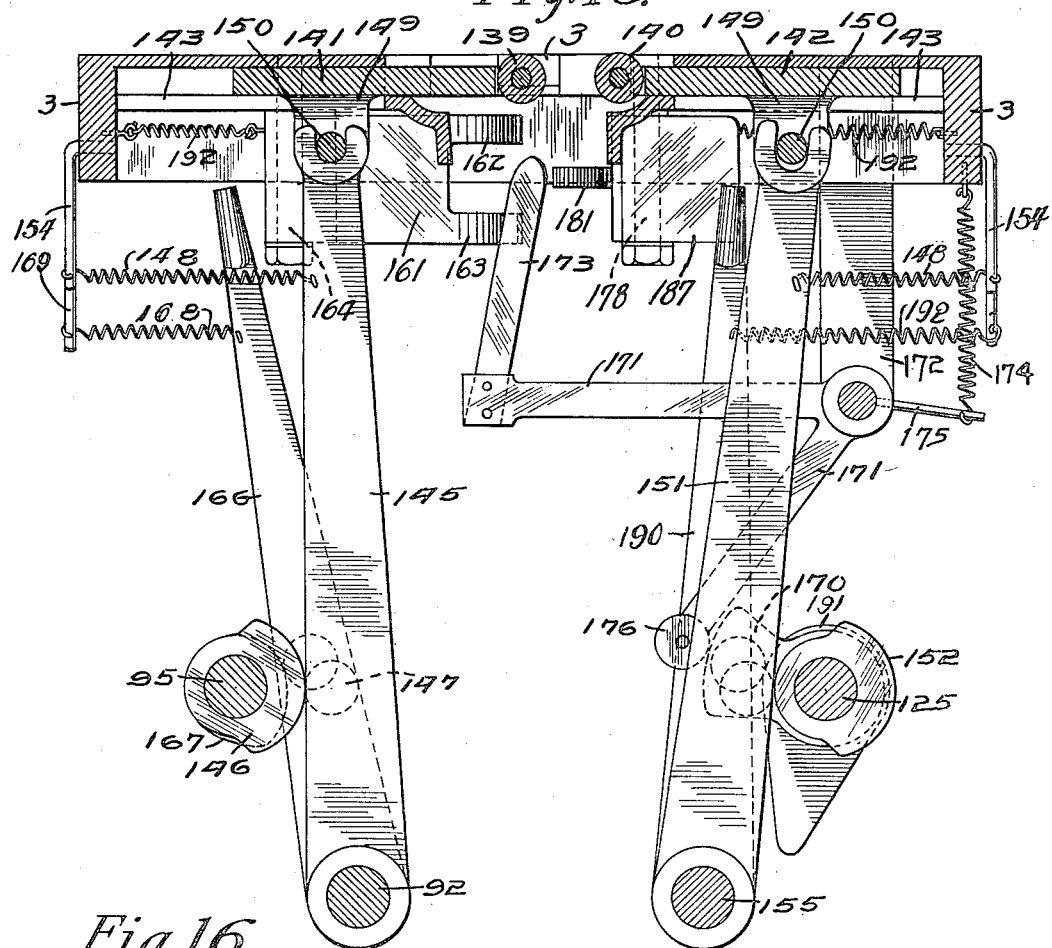
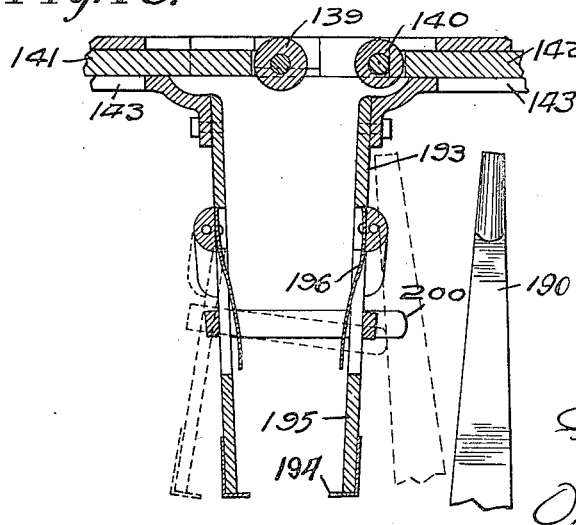

July 24, 1923.
F. E. BEAM
PACKAGE FORMING MACHINE
Filed Dec. 2, 1920   12 Sheets-Sheet 10
1,462,566
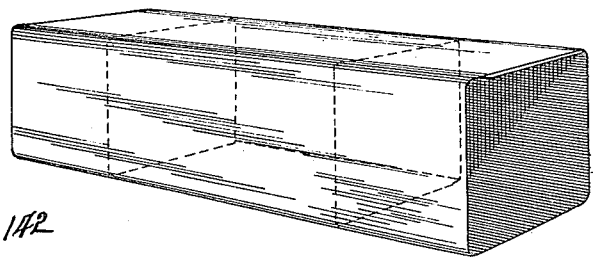
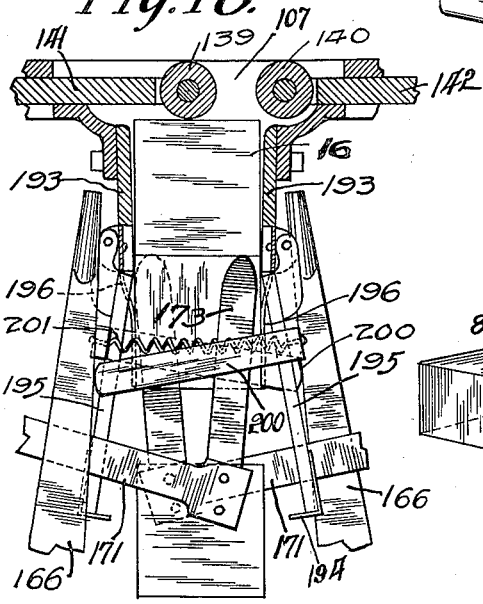
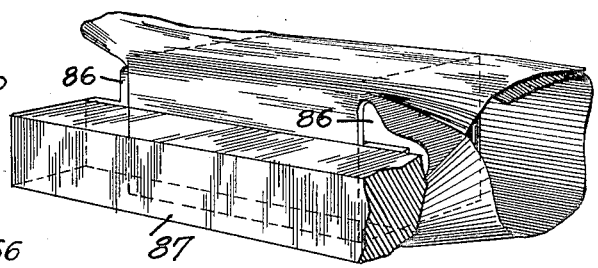
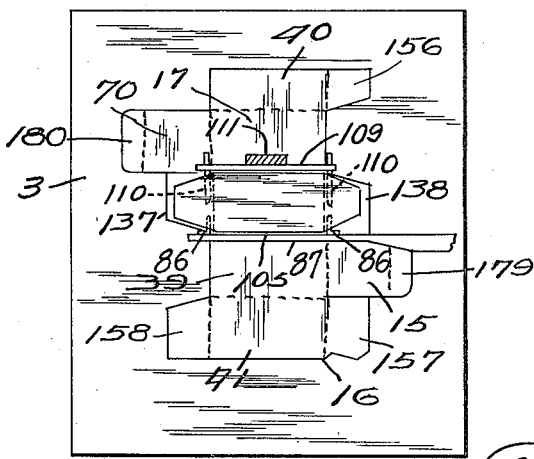
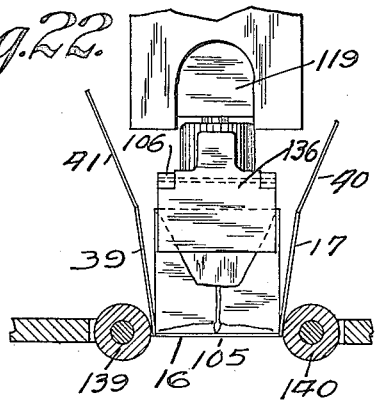

July 24, 1923. 1,462,566
F. E. BEAM
PACKAGE FORMING MACHINE
Filed Dec. 2, 1920 12 Sheets-Sheet 11

Inventor
Frank E. Beam
by
Owen, Owen & Crampton

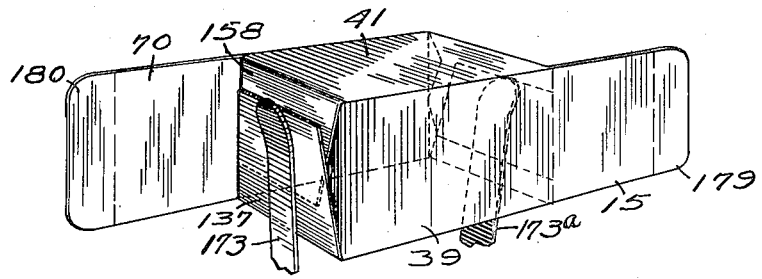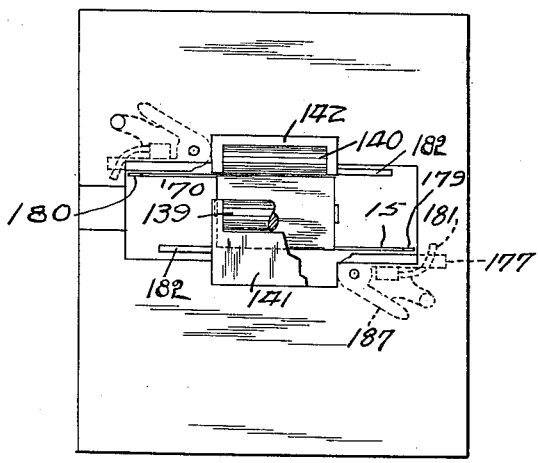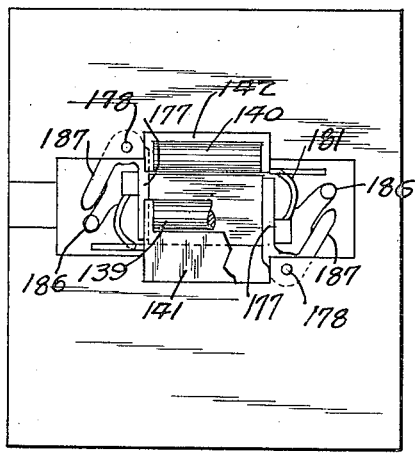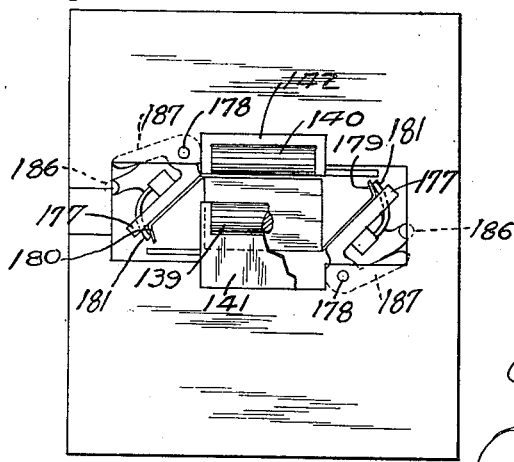

Patented July 24, 1923.

1,462,566

UNITED STATES PATENT OFFICE.

FRANK E. BEAM, OF TOLEDO, OHIO, ASSIGNOR, BY DIRECT AND MESNE ASSIGNMENTS, TO THE AUTOMAT MOLDING AND FOLDING COMPANY, OF TOLEDO, OHIO, A CORPORATION OF OHIO.

PACKAGE-FORMING MACHINE.

Application filed December 2, 1920. Serial No. 427,664.

*To all whom it may concern:*

Be it known that I, FRANK E. BEAM, a citizen of the United States, and a resident of Toledo, in the county of Lucas and State of Ohio, have made an Invention Appertaining to a Package-Forming Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to folding machines, and more particularly to those adapted to fold cartons or wrappers about articles or material to be packed.

Heretofore, so far as I am aware, it has been necessary in the placing of wrappers or cartons about bricks or molds of butter, ice cream, and other semi-plastic materials of a similar nature, to either first fold the carton or folder and then place the molded article therein, or to fold the cartons or wrappers by the exercise of considerable care in this operation in order to prevent injuring or changing the shape thereof.

The primary object of my invention is the provision of mechanical means for folding cartons or wrappers in a rapid and efficient manner about articles and particularly about those of a soft or semi-plastic nature, without destroying or changing the molded shape of the article. Further objects and advantages of the invention will be apparent from the following detailed description thereof.

My invention has for its object to provide a machine for folding sheet material about an article. It particularly has for its object to provide a machine for enclosing semi-plastic moldable materials, such as butter, oleomargarine, ice cream, etc. in a thin sheet of paper and in a carton.

The invention may be contained in structures of different forms. To illustrate a practical application of the invention I have selected a structure containing the invention and shall describe it hereinafter. The structure selected is illustrated in the accompanying drawings, in which,—

Figure 2:
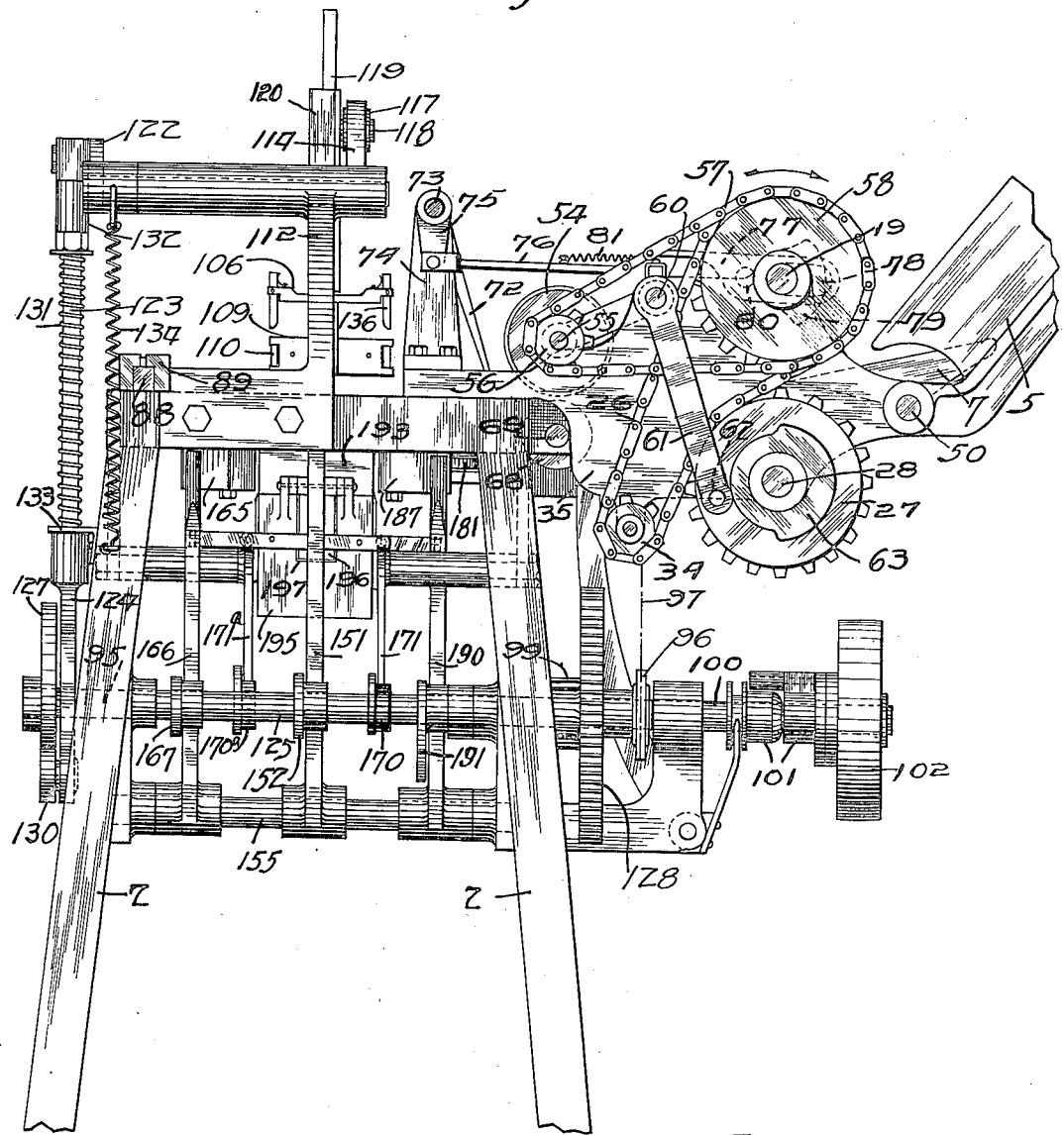
Figure 3:
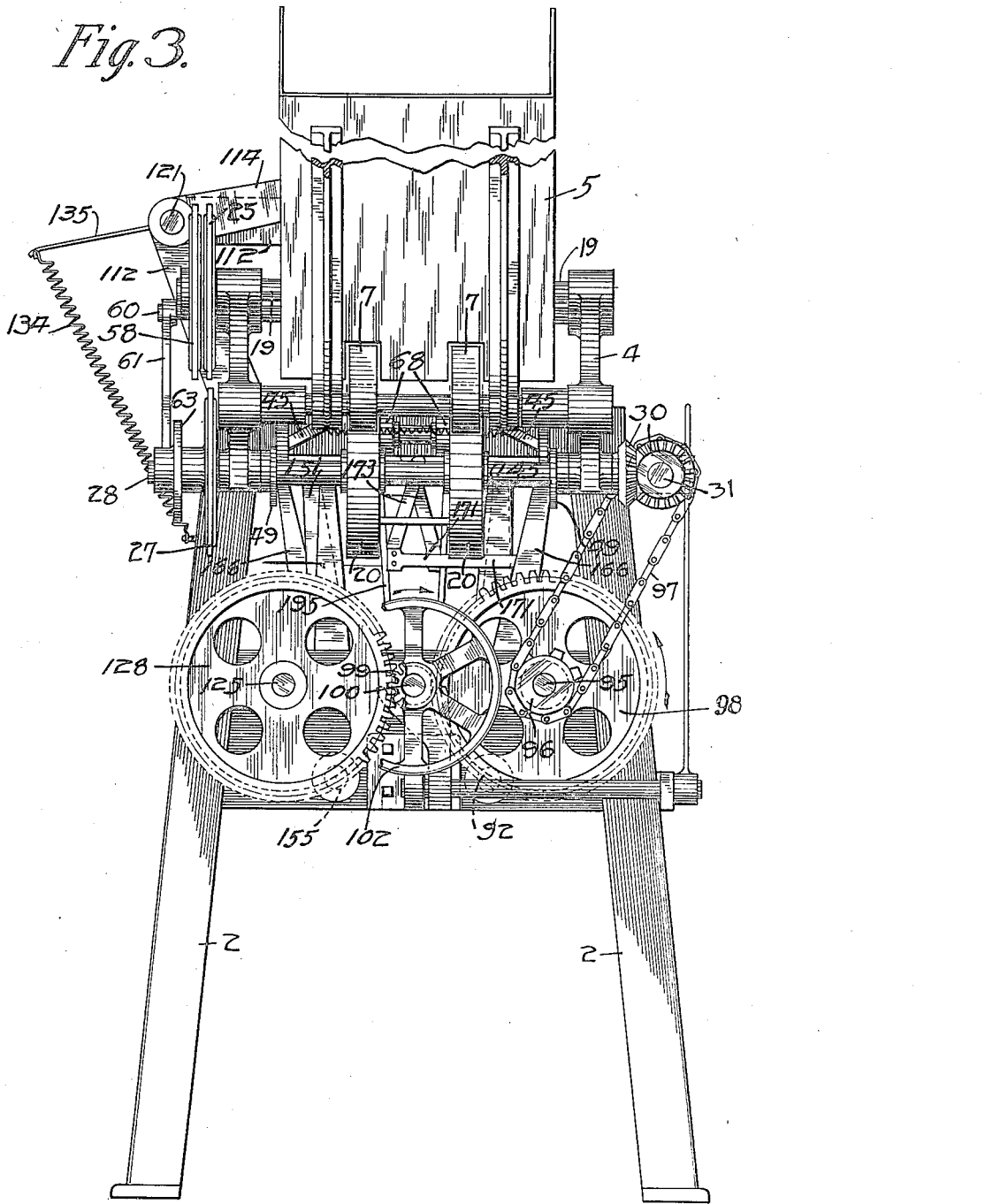
Figure 4:
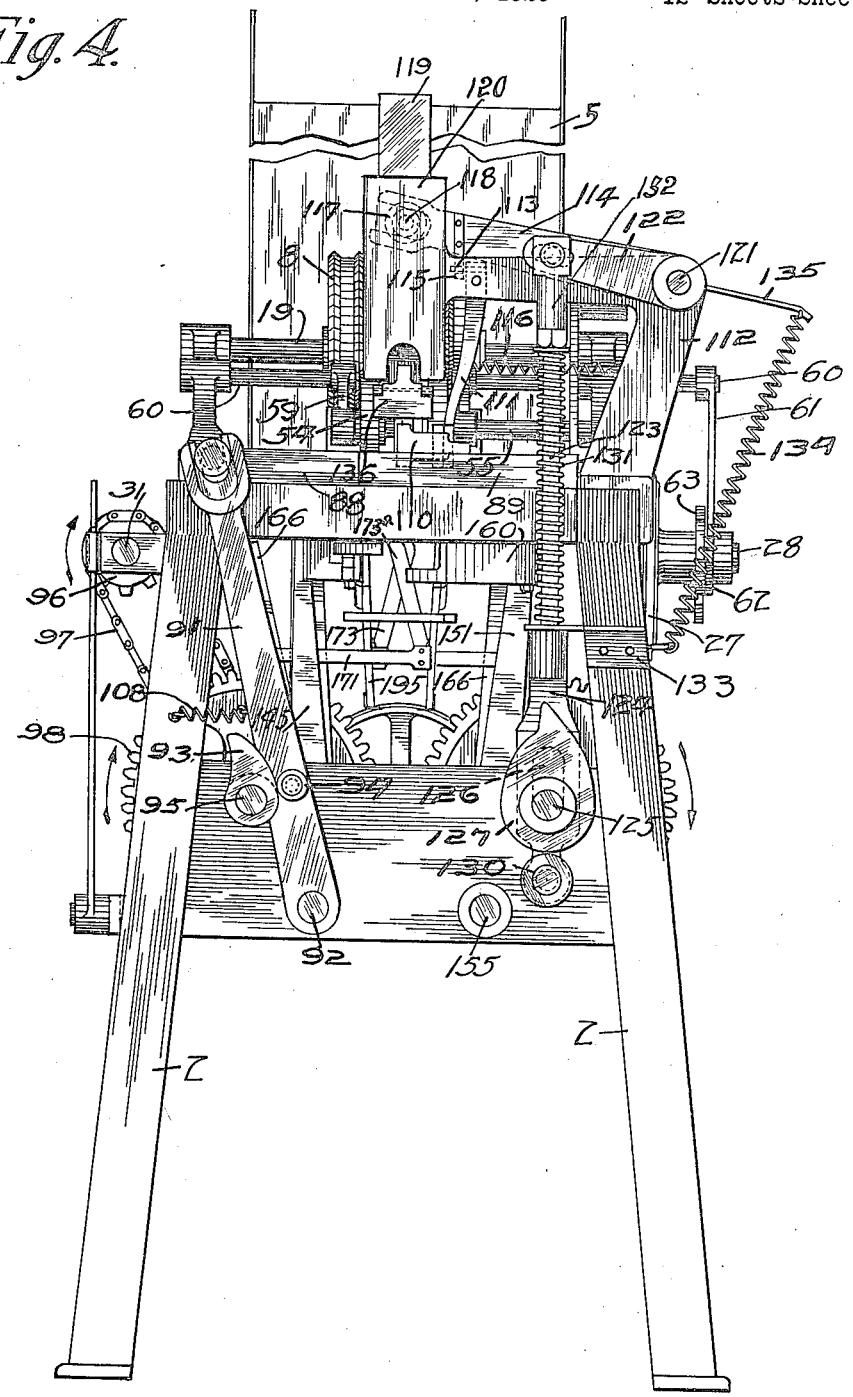
Figures 5, 6, 7, 8, 9:
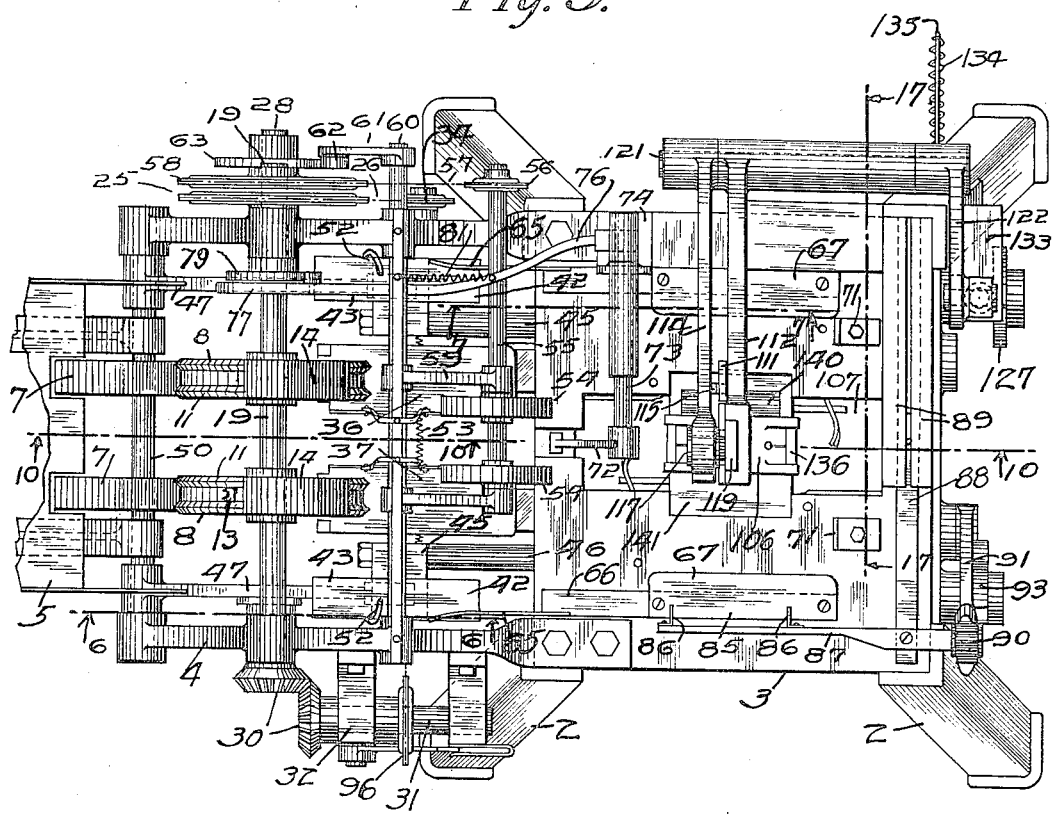
Figure 10:
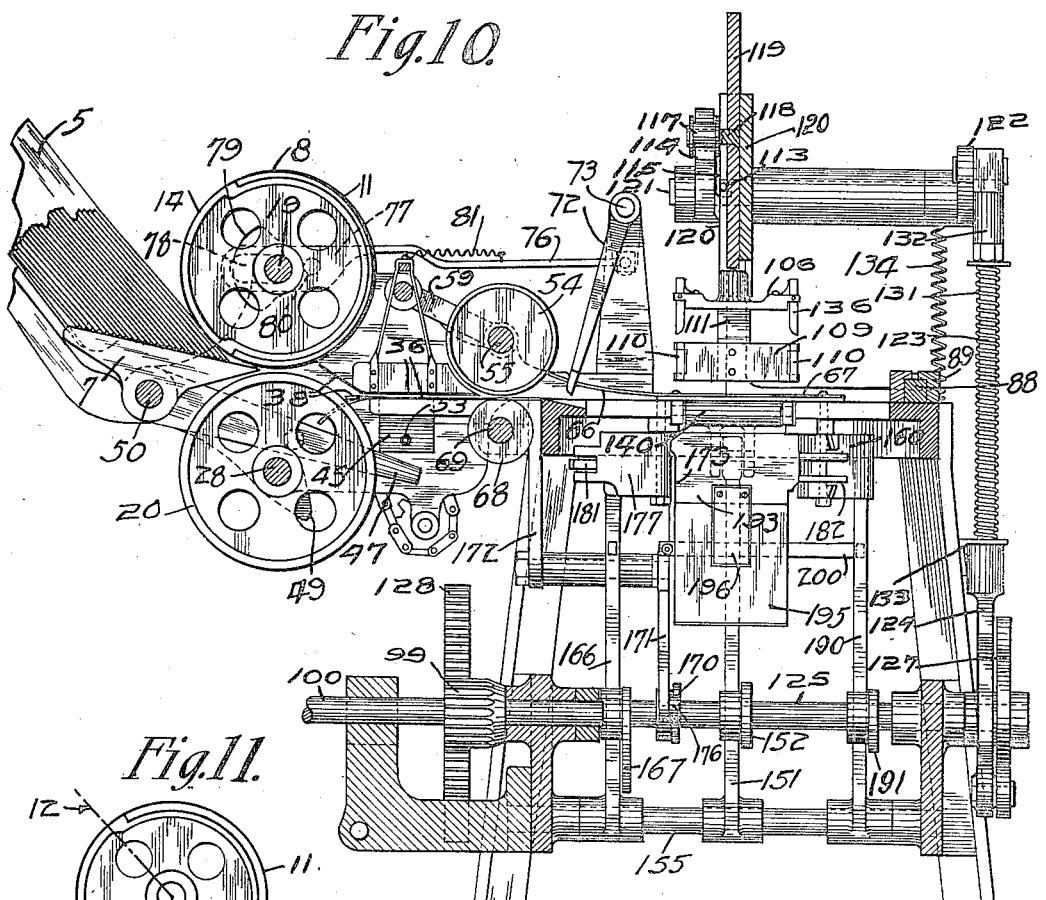
Figure 11:
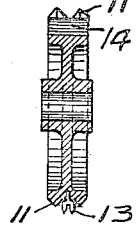
Figure 12:
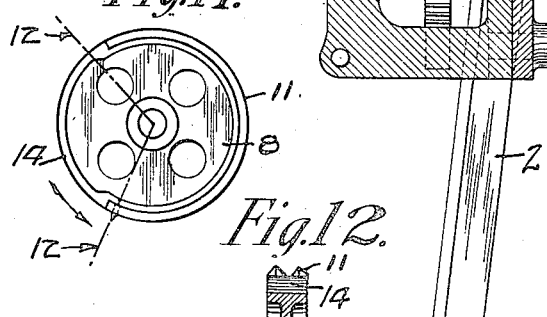
Figure 17:
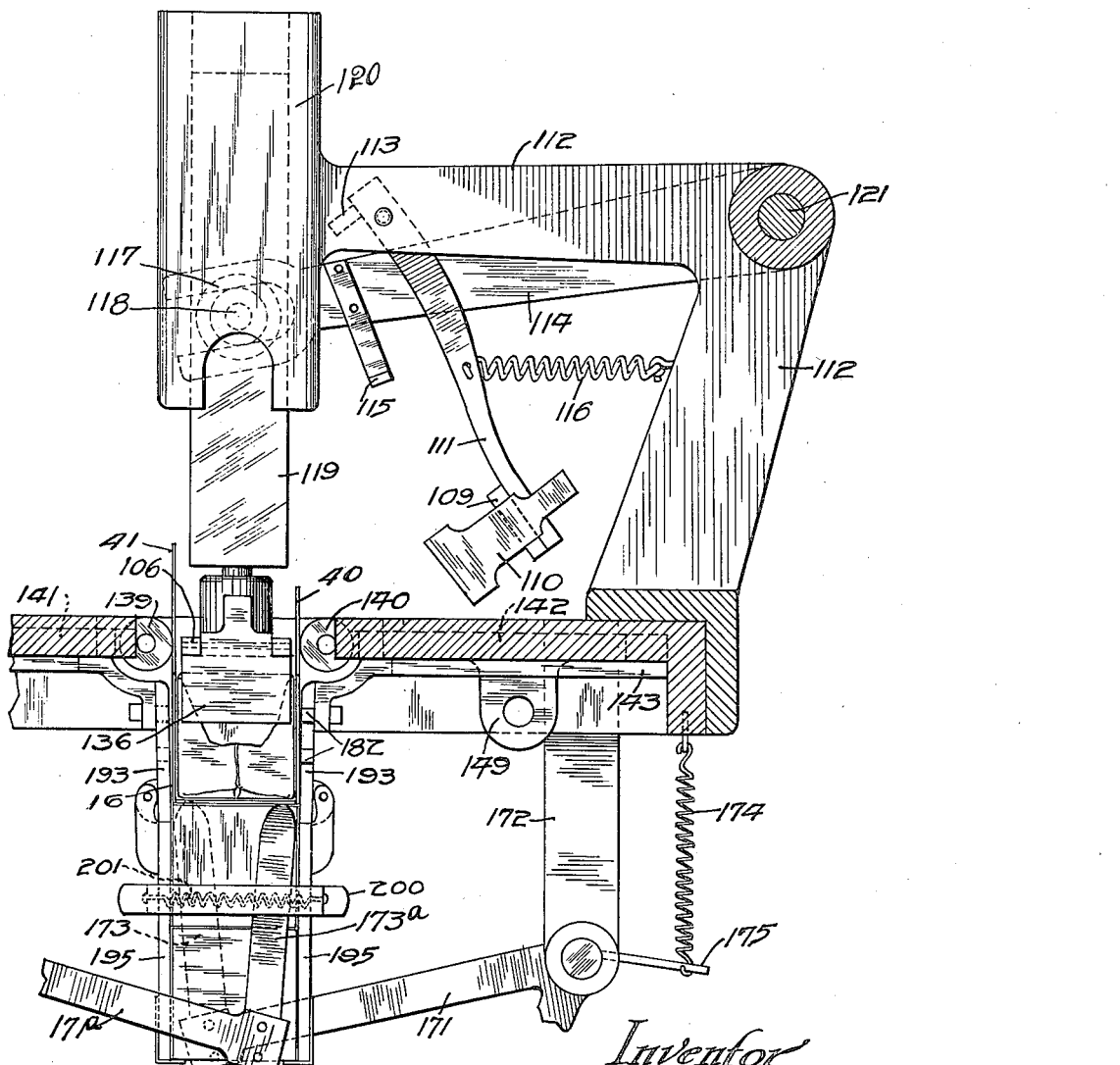
Figure 26:
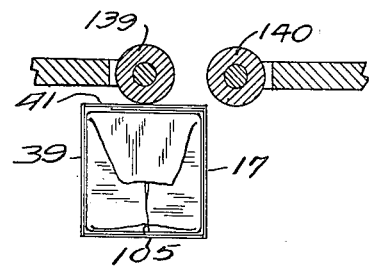
Figure 27:
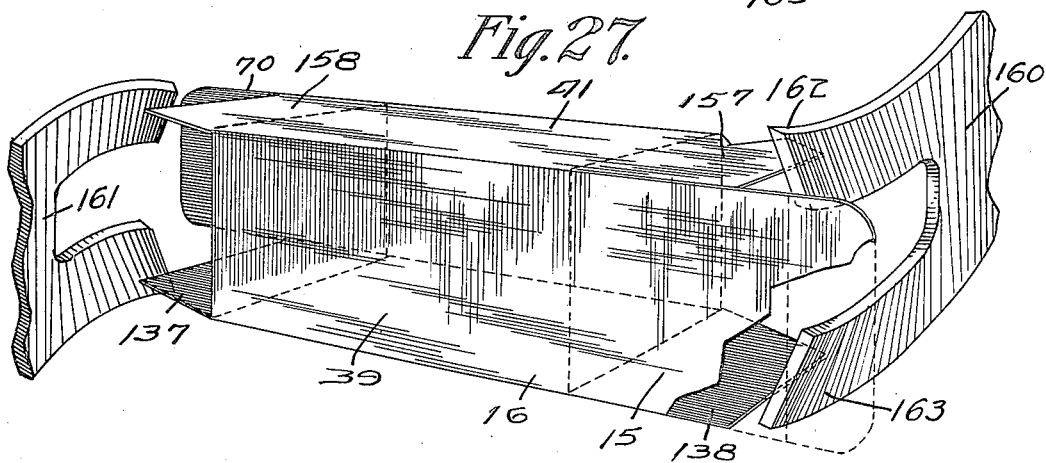

Figure 1 is a front view of a machine containing the invention. Fig. 2 is a rear view of the machine, with a part broken away. Fig. 3 is an elevation of the end of the machine to which the carton in blank form is fed. Fig. 4 is a view of the end of the machine opposite to that shown in Fig. 3. Fig. 5 is a top view of the machine, with a part broken away. Fig. 6 is a fragmentary sectional view taken on line 6—6 in Fig. 5. Fig. 7 is a fragmentary view taken on the line 7—7 in Fig. 5. Fig. 8 illustrates one of the folding elements in open position. Fig. 9 illustrates the same folding element in closed position. Fig. 10 is a sectional view taken on the line 10—10 in Fig. 5. Fig. 11 is an illustration of a feeding wheel for the carton blanks. Fig. 12 is a sectional view of the wheel taken on the line 12—12 in Fig. 11. Fig. 13 illustrates a top view of the table, with parts broken away and some of the mechanism removed for purpose of illustration. Fig. 14 is a sectional view taken on the line 14—14 in Fig. 13. Fig. 15 is a sectional view taken on the line 15—15 in Fig. 13, with parts of the mechanism removed. Fig. 16 is a broken vertical sectional view of a portion of the folding mechanism. Fig. 17 is a fragmentary vertical section taken on the line 17—17 in Fig. 5. Fig. 18 is a vertical fragmentary section illustrating the package releasing mechanism. Fig. 19 is a perspective view of a brick partially wrapped in a thin paper preparatory to having a carton folded therearound by the machine. Fig. 20 is a perspective view of the thin paper wrapped article held in the machine preparatory to being moved to carton receiving position. Fig. 21 is a plan view showing the thin paper wrapped article in folding position over a carton blank. Figs. 22 to 26 inclusive illustrate the successive folding steps employed in wrapping the carton around the sides of the article. Fig. 27 is an enlarged perspective view illustrating the next folding operation which takes place on the end flaps of the carton, and Figs. 28 to 31, inclusive, illustrate the successive end flap folding steps.

The machine is designed particularly for wrapping blocks of butter, oleomargarine, or ice cream in tissue or waxed paper and enclosing the blocks in cartons that are folded by the machine into box form about the blocks.

Referring to the drawings, 1 designates a table having the legs 2 and the top 3 to which the parts of the mechanism are connected. A frame 4 is connected to the table 1 and has an inclined container 5 into which the carton blanks may be placed and from whence they are successively drawn and fed to the folding mechanism of the machine.

When the cartons are placed in the container their lower end edges will rest upon the guides 7 (Figs. 5 and 10), which have faces that are inclined inward toward the machine and operate to cause the lower end edges of the consecutive cartons to be disposed slightly in advance of one another, since the bottom of the container or trough 5 is also located in an inclined position. The lower edges of the cartons being located on the inclined faces of the guides 7 the cartons slide forward, that is, toward the machine body until they rest against the feed wheels 8. The wheels 8 are provided with flat peripheral rubbing engaging surfaces 14, disposed on the same side of the shaft 19 to which the wheels 8 are keyed, one of the wheels 8 being provided with an engaging fork 13 (Figs. 5 and 12), which is located slightly in advance of the rubbing engaging surface 14 of the wheel. The fork 13 operates to engage or slightly puncture the carton blank that is in contact or in proximity to the wheel. This drags the carton forward until it is engaged by the rubbing surfaces of the wheels 8. At the same time that the cartons are engaged by the surfaces 14 of the wheels 8 they are also engaged on the lower side by the wheels 20, which coact with the wheels 8 to draw consecutive cartons into the machine.

Each wheel 8 is provided with a pair of peripheral ridges 11, as shown in Figs. 5, 11 and 12, that extend the major distance around the wheel, or to the ends of the surface 14, and a forked pin 13 is located at the following end of the peripheral ridge 11 of one wheel. The ridges 11 operate merely to permit the cartons to rest against the wheel 8, without being drawn into the machine and until they are engaged by the forked pin 13.

The cartons 16 are of the type well known in the art, being formed of panels, lips and tongues that are folded to form a box-like structure. They are so placed in the container or trough 5 that the tongue 15 will be engaged by the forked pin 13 on one wheel 8, and thus the carton will be drawn between the sets of feed wheels 8 and 20 and fed thereby into the machine.

The shaft 19 to which the wheels 8 are keyed is driven by means of the sprocket-wheels 25 (Figs. 3 and 5), the chain 26, the sprocket wheel 27 and the shaft 28 to which the wheels 20 are keyed, whereby the wheels 8, and 20 will rotate together. The shaft 28 is driven through a pair of bevel gears 30 from a shaft 31 supported in bearing blocks 32 that are secured to the bracket 4. The shaft 31 is suitably driven as hereinafter described. The sprocket chain 26 passes over an idler 34, which is located on an arm 35, whereby suitable tension or adjustment can be made in the chain 26. The chain 26 passes over merely a segment of the wheel 27 instead of passing around the wheel 27 and the teeth located in the segment operate to cause rotation of the wheel 25.

As the cartons are drawn and pushed into the machine by the operation of the feed wheels 8 and 20, they pass between two pairs of guides 36 and 37 (Figs. 5 and 10) having flaring lips 38 for receiving the leading edges of the cartons. The guides 36 and 37 are so disposed in the machine that the side panels 17 and 39 of the cartons 16 will respectively pass between them. Also they are so disposed that the outer edges of the respective guides 36 and 37 will be located directly above the outer edges of the side panels 17 and 39 of the cartons, which edges form two of the corners of a carton when folded to form a box-like container or package. The carton panels 40 and 41, which are subsequently overlapped and form the top of the carton, at the same time pass over preliminary folding or creasing members 42 having downwardly extending lips 43 (Fig. 6), whereby movement of the panels 40 and 41 of the carton above the members 42, as the cartons advance, is assured.

When a carton has advanced to a point over the preliminary folding or creasing members 42 the advancing of the carton is arrested by reason of it passing from engagement with the feed wheels 8 and 20, and the members 42 are raised to bend the portions 40 and 41 of the carton upward. The raising of the members 42 is effected by the upward rocking of rocker blocks 45 (Figs. 6, 8 and 9) by which they are carried, which blocks are pivotally supported on the ends of the pins 46 supported in the table top of the machine.

The blocks 45 are V-shaped and are engaged by rocker arms 47. Rollers 48 are carried by these arms, and cams 49 operate on the rollers to raise the arms 47, which arms are rotatively supported on the shaft 50. The ends of the arms 47 when raised strike the lower sides of the V-blocks 45 and raise the members 42, which in turn raise the carton panels 40 and 41. The cam 49 is located on the shaft 28 to which the wheels 20 are secured whereby operations of the cams 49 may be properly timed with respect to the operations of the wheels 8 and 20.

The folding members 42 are provided with fingers 52 that extend over the carton panels 40 and 41. These fingers may be formed of elastic wire and be provided with ends that are slightly turned toward the forward side of the machine so that the edges of the cartons will be directed beneath the ends of the fingers 52, and the panels 40 and 41 of the carton yieldingly held against the members 42. When, therefore, the arms 47 are lowered by the operation of the cams 49 and the spring 53, that connects together the under sides of the blocks 45, the fingers 52 operate to bring the panels 40 and 41 down with the members 42.

The carton is now moved forward by the rubber tired or faced wheels 54, that are lowered to engage the carton after the members 42 have returned to lowered position. The wheels 54 are located on a shaft 55 that is rotated by the sprocket wheel 56 which is driven by the chain 57 and the sprocket wheel 58 from the shaft 19. The shaft 55 is supported on the arms 59 that are secured to the shaft 60 to which is also keyed the arm 61 having the roller 62. The shaft 28 is provided with a cam 63, which operates upon the roller 62 to rock the shaft 60 and its arms 59 and 61. The cam 63 operates to permit the wheels 54 to be lowered upon the cartons, and the cam 63 being located on the shaft 28 the operations of the wheels 54 upon the cartons is properly timed with respect to the other mechanism of the machine.

The wheels 54, being continuously rotated, operate when lowered to push a subjacent carton forward between guides 65, secured to the top of the table 3 adjacent to opposite side edges thereof, and with their side edges passing beneath the flaring lips 66 and the inwardly extending lips 67 and held downward thereby to the table top.

A pair of wheels 68 (Figs. 2, 3 and 10) are located on a shaft 69 directly beneath the wheels 54 so that when the latter are lowered they cooperate with the wheels 68 to grip an interposed carton. As the continuously rotating wheels 54 are lowered into engagement with a carton they carry it forward and cause rotation of the wheels 68, thereby eliminating the friction that would ordinarily be caused if the cartons rested upon the table top.

When the cartons are carried forward to the point where one of the wheels 54 runs off the tongue 70 thereof, the wheels are raised by the operation of the cam 63. The carton is now so located that its edges are beneath the inwardly extending lips 67. The carton is, however, carried forward a short distance further until its forward end strikes the stops 71 located on the table top 3 adjacent to its forward or right hand end, this movement being effected by the movement of an arm 72 (Fig. 10), which is secured to the shaft 73 supported on a bracket 74. The shaft 73 is also provided with an arm 75 (Fig. 2) that is connected to the end of a rod 76, which is provided at its other end with a slotted plate 77. The shaft 19 extends through the slot 78 of the plate, and a cam 79 is keyed to the shaft in position to operate upon a roller 80 located on the slotted plate 77. The cam 79 operates to move the rod 76 forward and when the roller 80 runs off the raised portion of the cam 79 the arm 72 is brought back by the operation of the spring 81, which is connected to the rod 76 at one end and to a suitable part of the supporting frame of the machine at the other end. The arm 72 holds the carton against the stops 71 while the raised portion of the cam 79 rides on the roller 80 during which time certain operations of the machine are performed.

The cartons is now in position to receive the brick of butter or other material to be enclosed therein. The brick is rolled in a paraffined paper by an operator, the end edges of the paper overextending the ends of the brick, as illustrated in Fig. 19. The brick is then placed by the operator upon the plate 85 which has the lip 67 adjacent to the front edge of the table 3 extending inwardly therefrom and which lip extends over one of the side edges of the carton. The brick is placed on the plate 85 by an outward or forward sliding movement toward the operator so that the fingers 86, projecting inwardly from the arm 87, will turn end portions of the paraffined paper inward against the ends of the brick, as shown in Fig. 20, the outward movement of the brick being stopped by the arm. The arm 87 is connected to a bar 88 (Figs. 2, 5 and 10), which is guided for sliding movements transversely of the table top by guides 89. The arm 87 is provided with a roller 90, located in the forked end of an arm 91. This arm pivotally rises from a shaft 92 (Fig. 4), and is swung on the shaft by a cam 93, which operates upon a roller 94 on the arm. The cam 93 is located on a shaft 95, which is connected to and drives the shaft 31 by the sprocket wheels 96 and the sprocket chain 97 (Figs. 1 and 3). The sprocket-wheels 96 and the bevel gear wheels 30 are of the same size and consequently the shafts 19, 28 and 95 rotated at the same speed and the crosswise movements of the arm 87 are in the proper cycle of the operations of the machine. The shaft 95 carries a gear 98, in mesh with a pinion 99 (Fig. 10) on the main drive shaft 100 of the machine. In the form shown I have provided a friction clutch 101 (Fig. 1), which operates to connect the shaft 100 with the driving pulley 102 which may be belted to a suitable source of power.

The arm 87, when moved inward by a forward swinging of the arm 91, moves the brick in the partially folded paper to the center of the table and to a point over the bottom panel 105 of the carton, beneath the plunger 106 and above the opening 107 located in the table top, the brick being supported by the carton blank above said opening. The brick when moved to this position is also brought into contact at its forward side with a stop plate 109 (Figs. 10 and 17), provided at its ends with fingers 110, which operate on the respective extended end portions of the paper wrapper to turn the engaged sides thereof inward against the brick ends in lapping relation to the folds previously made by the fingers 86. The arm 87 and its fingers 86 are then withdrawn by the action of a spring 108, secured at one end to the frame 1 and at its other end to the arm 91 the operation of the cam 93 permitting such movement.

The plate 109 is carried at the lower end of an arm 111 (Fig. 17) which is pivotally suspended from the upper portion of a bracket 112 for swinging movements transverse to the table. The bracket 112 is of angled form and projects upward from the rear edge of the table top 3 and thence forward, terminating at its free end in a guide head 120 positioned in spaced vertical register with the table opening 107. The arm 111 is normally retained in rearward retracted position, as shown in Fig. 17, by a spring 116, connecting the arm to the upright of the bracket 112. A rocker shaft 121 is journaled in the elbow of the bracket 112 longitudinally of the frame and has an arm 114 projecting forward therefrom and terminating in a fork at a side of the guide head 120. The arm 114 has a hooked finger 115 projecting therefrom in position to engage with a pin 113 on the upper end portion of the arm 111 and effect a rocking of the arm to its forward operative position during the last portion of the upward stroke of the rocker arm 114. The rearward movement of the arm 111 and its stop plate 109 from operative position takes place during the return movement of the brick advancing arm 87 to its normal position at the forward edge of the table top.

A slide 119 operates vertically in the guide head 120 and carries a plunger 106 at its lower end in position, when lowered, to engage a registering brick top and force it, together with the carton on which it rests, down through the opening 107 of the table top. The plunger 106 for this purpose is of a shape corresponding to the top shape of the brick to be acted on. Reciprocatory movements are communicated to the slide 119 from rocking movements of the arm 114 by reason of a roller 117 carried by a stub shaft 118 projecting from the upper portion of the slide 119 through a registering side opening in the head 120, engaging within the fork of the arm 114. The shaft 121, which carries the rocker arm 114, is provided at its right hand end with a forwardly projecting rocker arm 122 having a rod 123 projecting downwardly therefrom. The lower end portion of this rod is provided with a longitudinally extending slot 126 and carries a roller 130 below the slot. A shaft 125, which is journaled longitudinally in the frame 1, has an end thereof projecting through the slot 126 of said rod and carries a cam 127 in coaction with the roller 130 to cooperate therewith to impart a lowering movement to the rod 123 and a consequent lowering movement of the plunger 106 during a predetermined portion of each revolution of the shaft 125. A spring 131 surrounds the rod 123 and has its opposing ends thrust against a frame bracket 133 and a shoulder or enlargement 132 on the rod to return the rod to its normal raised position upon being released by the cam. This return movement of the plunger to its normal position is also effected by the action of a spring 134 which connects the frame 1 with a rod 135 projecting rearwardly from the inner end of the rocker arm 122. The shaft 125 is driven from the main drive shaft 100 by reason of the pinion 99 on said latter shaft meshing with a gear 128 on the former. The gear 128 is the same size as the gear 98 on the shaft 95, which latter gear is also driven by the pinion 99 so that both shafts 95 and 125 are driven at the same speed.

The plunger 106 is provided at its ends with the spring pressed fingers 136, which, upon a lowering of the plunger into engagement with the subjacent brick, act on the upper portions of the end extensions of the thin paper wrapper on the brick to fold such portions down against the ends of the brick, thus completing the wrapping of the brick within the paraffin paper, except for the bottom portions of the extensions of such paper which lie upon or over the flaps 137 and 138 of the carton.

Figure 23:
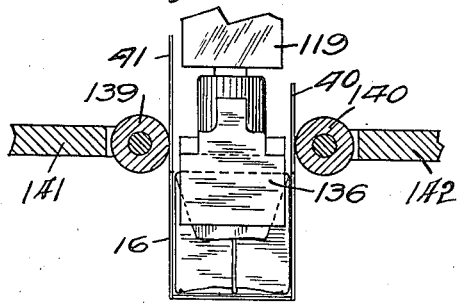

The plunger 106, after striking the top of a brick on its down stroke, continues to move down until it forces the brick and carton into the opening 107 between the rollers 139 and 140 and below the horizontal plane of said rollers. The rollers 130 and 140 are respectively supported in slide plates 141 and 142 located immediately beneath the table top, being slidingly held thereto by guide flanges 143 (Fig. 15). When the plunger moves the brick and carton down below the level of the table top the rollers are located at a distance from each other substantially equal to the width of the bottom panel 105 of the carton, so that as the brick is pushed down between the rollers the side panels 17 and 39 of the carton are pushed up against the sides of the brick, as shown in Fig. 23. The brick and carton are pushed down against the brick that was enclosed in its carton during the preceding cycle of operations of the machine.

Figure 24:
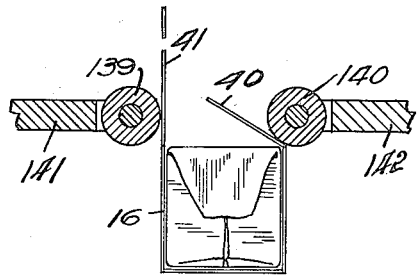
Figure 25:
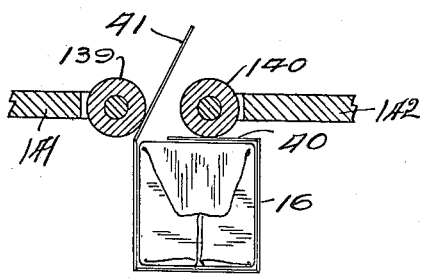

When the plunger has pushed the brick down below the rollers 139 and 140 the roller 140 is first moved forward across the top of the brick to fold the top flap 40 of the carton down over the brick, as illustrated in Figs. 24 and 25, the bend of the flap taking place where it was previously bent by the action of one of the members 42. The roller 140 is then immediately retracted and the roller 139 simultaneously therewith moved rearward to fold the carton flap 41 down over the brick and previously folded flap 40, as shown in Figs. 25 and 26. This completes the closing of the top, bottom and sides of the carton around the brick. The roller 139 remains in its flat holding position over the top of the carton during the subsequent folding operations of the machine and until the next carton has been fed into position over the table top opening 107 and a brick moved thereover. The roller 139 is retracted however, during the down stroke of the plunger 106 so that as the plunger strikes the top of a subjacent brick, the brick and carton are free to be forced down thereby through the opening 107. It is thus evident that the roller 139 and its slide serve to support the weight of the brick over a table opening 107 until the period when the brick and its carton are to be forced down through the opening.

The slide plate 141 carrying the roller 139 has its reciprocatory movements imparted thereto by the swinging of a rocker arm 145 rising loosely from the shaft 92 (Fig. 15). Positive forward movements are imparted to the arm 145 during a predetermined portion of each revolution of the shaft 95 by a cam 146 on said shaft acting against a roller 147 on the arm. The plate 141 is provided on its under side with a pair of ears 149 in which is located a pin 150 that extends through the free fork end of the arm 145.

The plate 142 carrying the roller 140 is also provided on its under side with a pair of ears 149 having a cross-pin 150 engaging the upper forked end of a rocker arm 151, which loosely rises from a shaft 155 journaled longitudinally in the frame in parallelism with the shaft 92 and in the horizontal plane thereof. The shaft 125 has a cam 152 thereon which positively acts, during a portion of its revolution, against the arm 151 to force it inward to impart a flap folding movement to the slide 142. The arms 145 and 151, the actuating cams therefor permitting, are returned to their normal outward or retracted positions by the action of springs 148, which connect the respective arms to stationary arms 154 projecting downward respectively from the rear and front side edges of the table top.

While the roller 139 remains over the top of the carton the flaps 156 and 157 at one top end edge of the carton and the flap 158 at the other top end edge of the carton are turned down against the respective ends of the brick, and the flaps 138 and 137 at the lower edges at opposite ends of the carton are turned up against the respective brick ends and in lapping relation to the flaps 157 and 158, respectively. These operations are performed by pivoted or horizontally swinging fold-plates 160 and 161 (Figs. 13, 14, 15 and 27), the free or flap engaging end of each of which is provided with curved fingers 162 and 163, with the upper finger 162 bent forward slightly more than the lower finger 163 toward the carton end. The fingers 162 and 163 are inwardly inclined away from the end of the brick to be enclosed in the carton so that as each plate is swung toward the end of the brick the end edge of the flap 158 will be engaged by the upper finger 162, and by reason of its angular relation to its direction of motion towards the end of the brick, the end edge of the flap will be turned downward against the brick. Disposing the finger 162 of each fold-plate in advance of its companion finger 163 causes the flaps engaged by the fingers 162 to be bent inward a little in advance of the flaps engaged by the fingers 163 so that the lower flaps 137 and 138 of the carton will be caused to lap the outer sides of the upper flaps 158 and 157, respectively. The fold-plates 160 and 161 are pivotally supported on vertical studs 164, 164 extending down from the table top, being disposed at opposite sides of the longitudinal center line of the frame with one at the right of the slide 141 and the other at the left of the slide 142. Each fold-plate 160 and 161 has a cam block or arm 165 projecting outward from its inner end and, in the present instance, mounted on the respective studs 164 for rocking movements relative thereto, and each cam block is acted on by a rocker arm 166 to impart the requisite rocking movements thereto for the flap folding operations of the plates 160 and 161. The arms 166 loosely rise from the respective shafts 92 and 155 and are respectively moved by the cams 167, located on the shafts 95 and 125, against the action of the springs 168, which are connected to the arms 166 and to arms 169 secured to the table top (Fig. 15).

While the fingers 162 and 163 are in holding engagement with the flaps at the left end of the brick, a cam 170 located on the shaft 125 operates upon a bell crank lever 171 (Fig. 15), which is pivoted on a bracket 172 secured to the under side of the table top adjacent to its rear edge, to raise an upright finger 173, carried thereby, up in holding engagement with the flap 137 to hold it and the flap 158 in the position into which they have been folded. A similar bell-crank-lever 171ª is pivoted on a bracket 172ª below the forward edge portion of the table top and carries a finger 173ª for engaging the end flap 138 at the end of the brick and holding it and the flaps 156 and 157 in the position in which they have been folded, this action taking place while the fingers 162 and 163 are in holding engagement with such flaps. The lever 171ª is operated by a cam 170ª on the shaft 95. The return movements of the fingers 173 and 173ª when released for such purpose by the cams 170 and 170ª are effected by springs 174 (Figs. 15 and 17), one of which is provided between a pin 175, projecting outwardly from the elbow of each lever 171, 171ª, and the table top. Each bell-crank-lever 171, 171ª is provided at its lower end with a roller 176 for coaction with the respective operating cam.

While the end flaps already folded are held in position by the fingers 173, 173ª, the outer end flaps 15 and 70 are folded over into closing relation to the respective carton ends by the respective folding plates 177, 177, which are pivoted on vertical studs 178 extending down from the table top at opposite ends of the carton and at opposite sides thereof, as shown in Fig. 13. The flaps 15 and 70 are scored so as to divide each of the flaps into two parts, namely, the body portion that extends across the end of the brick and the respective end insertion portions or tongues 179 and 180 that are turned inward at right angles to the body portions and caused to pass between the brick and the respective side portions 17 and 39 of the carton, thereby completing the folding and closing of the carton.

The end portions or insertion tongues 179 and 180 of the flaps 15 and 70 are broken along the scored lines by means of fingers 181 which are pivotally carried by the plates 177 and are curved, as shown, to engage the end edges of the flaps, and as the plates 177 are turned inward on the pivots 178 the engaged flaps are bent inward and caused to assume a curve against the finger 181 until the end of such finger passes between the ends of a forked plate 182 and strikes the plate at the point of union of the forks to the plate, which is in close proximity to the end of the brick, as illustrated in Figs. 13, 14, 29, 30 and 31. This action operates to stop each finger 181 in its movement with the plate 177 as the end of the finger is brought into alignment with the inside surface of the forked plate 182, and upon the continuing movement of the plate 177 the body portion of each flap 15, 70 is pushed toward the end of the brick and the end portions 179 and 180 of each flap are caused to enter between the brick and the respective side panel of the carton. The insertion of the flap ends into the carton at the sides of the brick is facilitated by reason of the flap ends striking and being guided by fingers 183 (Fig. 13) projecting through and disposed adjacent to the inner ends of the forked plates 182. Each finger 181 is carried by a pivot 184 located in ears 185 at the outer side of the respective plate 177, and the finger is yieldingly held in the full line position shown in Fig. 13 by the action of a spring 186, which is disposed between the finger and an arm 187 projecting from the inner end of the plate 177.

The plates 177 have positive inward folding movements imparted thereto by the operation of respective arms 190, which pivotally rise from the shafts 92 and 155 and are operated by cams 191 located in coacting relation on the shafts 95 and 125, the upper ends of these arms acting against the outer sides of the plate arms 187, as shown in Figs. 13 and 15. The arms 190, when released by the cams, are returned to their normal retracted positions by springs 192, which are connected at their outer ends to the frame.

During a folding of a carton about a brick the two are supported within a chute 193 by the carton previously folded, which is frictionally held between spring fingers 196 (Figs. 16 and 18), which fingers project downward and inward from the lower end of the chute 193 at opposite sides thereof. The chute 193 is secured at its upper end to the under side of the table top 3 in register with the opening 107 in the table. The opposite sides of the chute 193 are extended at their lower ends by plates 195, which are pivotally connected to the chute sides for lateral swinging movements relative thereto and are preferably of sufficient length to cooperate with the chute to contain three wrapped bricks, the lowermost brick being supported by inwardly projecting fingers 194 on the lower ends of the side plates. The side plates 195 are connected together by a spring 201 (Figs. 17 and 18) so that such plates are normally held in closed relation to the packages disposed therebetween. When the arms 190 are swung inward to move the plates 177 to finish the end folding of a carton said arms 190 strike the registering ends of respective bars 200 projecting in opposite directions crosswise of the chute from the plates 195 at opposite side edges thereof, thereby effecting an outward swinging of such plates against the tension of the spring 201 and permitting the lowermost carton in the chute to be dropped therefrom into a suitable receptacle or carrying away means. When the plates 195 are opened to drop the lowermost carton, the second carton is supported within the chute by the spring fingers 196. When the next unfolded carton and brick are forced down into the chute 193 preparatory to having the carton folded, the carton which was folded in the previous operation will be forced down in holding position between the springs 196 and the carton which was held by such spring will be forced down to the bottom of the chute extension formed by the plates 195 and caused to rest on the fingers 194 at the lower ends of such plates.

In the operation of the machine, a plurality of carton blanks are placed in flat position in the container 5 with their lower edges resting on the inclined supports 7 and with the lower edge of the outermost carton in position to be engaged by the fork 13 on one of the feed wheels 8 and fed thereby between the feed wheels 8 and 20 at a proper point in a cycle of operations. The carton is advanced by the feed wheels to a point below the plates 36 and 37 and with its opposite side edges disposed over the respective edge bending plates 42, 42, which plates are then raised by the upward movement of the arms 47, under the action of the cams 49, to effect a preliminary bending of the panel portions 40 and 41 of the carton relative to the panels 17 and 39 thereof. This having been accomplished the feed wheels 54 are lowered into engagement with the forward edge portions of the carton due to the releasing of the carrying means of such wheels by the cam 63. The carton is then advanced by the feeding action of the wheels 54 until the carton has passed free therefrom, when the feed arm 72 is swung forward by the action of the cam 78 and in engagement with the rear edge of the carton so as to advance the carton into contact with the stops 71, with the center or bottom panel 105 thereof disposed over the table opening 107 and below the plunger 106. As the carton is advanced to this position its side edges pass under the plates 67 and 85. By this time the operator will have placed a brick of butter or other material to be wrapped over the plate 85, the brick previously having had a thin paper wrapping placed therearound with its ends extending therefrom. As the brick is placed on the plate 85 it is moved forward into contact with the arm 87 and between the fingers 86, which latter fold in the adjacent side portions of the projecting ends of the paper wrapper against the ends of the brick, as shown in Fig. 20. The properly timed swinging of the arm 91 by the cam 93 imparts a rearward movement to the arm 87 and moves the engaged brick over the center of the placed carton and into stop contact with the stop plate 109. As the brick is brought into contact with the stop 109 the fingers 110 at the ends of said plate press the adjacent sides of the respective projecting end portions of the thin paper wrapper inward against the brick end. The placing arm 87 is now retracted to its normal position and the stop plate 109 is swung to its inoperative position, the latter being effected by the spring 116 and permitted by the lowering of the plunger actuating arm 114 which now takes place by reason of the action of the cam 127 on the plunger operating rod 123. During the placing of the brick over the opening 107 the folding roller 139 stands under the center of the brick within the opening to support the brick and carton. The plunger 106 then lowers and the roller 139 is retracted from brick supporting position. The plunger 106 in its lowering movement coacts with the top of the brick and forces it, together with the carton on which it rests, down through the opening 107 in the table and into the chute 193, this being permitted by reason of the chute wings 195 having previously opened and dropped the lowermost folded carton, so that the next carton in order is forced into the lower portion of the chute and the carton which was folded in the preceding operation is forced down between the holding springs 196 by the carton or brick on which the plunger is now operating. As the plunger 106 moves into engagement with the brick the fingers 136 at the ends thereof engage the upper sides of the projecting end portions of the thin paper wrapper on the brick and fold such portions down against the brick ends. The plunger is then retracted and the plate 142 moved forward to advance the folding roller 140 over the brick and top flap 40 of the carton to fold the latter down on the brick. As the roller 140 recedes from such folding operation the roller 139 is moved rearward in coaction with the top flap 41 to fold it down over the brick and previously folded flap 40, the roller 139 then remaining in this flap holding position until the next lowering of the plunger 106. The movement of the roller slides 141 and 142 is accomplished by cams 146 and 152 on the shafts 95 and 125 acting against the slide operating arms 145 and 151 respectively, the shafts being driven at the same speed and each making a complete revolution during a cycle of operations of the machine. The arms 145 and 151, when released by the cams are returned to their normal retracted positions by springs 148. The plates 160 and 161 at the opposite ends of the carton are then swung inward by the arms 166, acted on by the cams 167 on the shafts 95 and 125, and the curved and oppositely inclined fingers 162 and 163 on the free ends of the plates 160 and 161 are caused to coact with the respective upper and lower end flaps 156, 157 and 138 at one end and 137 and 158 at the other end and cause an inward folding of said flaps in lapping relation against the respective brick ends. The holding fingers 173 and 173ᵃ are now raised at the ends of the carton to hold the upper and lower end flaps in folded position after the retraction of the folding plates 160 and 161, such movement of the holding fingers being effected by the action of cams 170 and 170ª on the levers 171 and 171ª carrying the fingers, said cams being mounted respectively on the shafts 125 and 95. The end folding plates 177 are now brought into action, being actuated by the cams 191 on the shafts 95 and 125 through the medium of the rocker-arms 190. As the plates 177 are swung inward the end flaps 15 and 70 are carried therewith and the end tongues 179 and 180 respectively thereof are caused to assume an inward angled relation to the body portions of the flaps by the coaction therewith of the curved spring pressed fingers 181. When the plates 177 are near the limit of their inward swinging movements the ends of the fingers 181 coact with the members 182 to stop the movement of the fingers, thereby permitting the plates 181 during their continued inward movements to force the tongues 179 and 180 into the ends of the carton between the brick and adjacent side panels of the carton, the entrance of the tongues into the cartons being facilitated by the spring fingers 183. The holding fingers 173 are withdrawn from holding engagement with the upper and lower end flaps of the carton when the end flaps 15 and 70 have been moved inward sufficiently to coact with said upper and lower end flaps and prevent an unfolding movement thereof. This practically completes a cycle of operations of the machine.

It is found in practice that my machine will operate to rapidly feed cartons to the folding parts of a machine and close the same about a brick of butter, or other material to be wrapped, and that the folding is accomplished in such a manner that no such pressure is brought to bear at any time on the brick as to change the molded shape thereof or injure its edges. This is a very important feature, for, so far as I am aware, it has heretofore been necessary to wrap cartons about bricks of soft semi-plastic material by hand in order to prevent injury thereto.

I wish it understood that my invention is not limited to any specific construction, arrangement, form or combination of the parts, as it is capable of numerous modifications and changes without departing from the spirit of the claims.

I claim:—

1. In a package forming machine, a shiftable member having a pair of fingers for receiving and folding the end side portions of the sheet material in which the object is wrapped against the ends of the object, a swinging member having fingers for folding the opposite side end portions of the sheet material against the ends of the object, a plunger having fingers for folding the top end portions of the sheet material against the ends of the object, and means for shifting the shiftable member towards the swinging member and to move the object and its enclosing wrapper to a point beneath the plunger.

2. In a package forming machine, means for folding sides of a sheet material about an object, means for folding opposite end portions of the sheet material over the ends of the object, means for bending side end portions of the sheet material and inserting the ends of the last mentioned portions between the object and the opposite side of the folded sheet material.

3. In a package forming machine, a stationary object supporting member, a reciprocally shiftable member for receiving objects supported by the member, means for operating the shiftable member to move the objects from the supporting member onto the sheet material in which the objects are to be wrapped and then to return it to object receiving position, means for folding the sheet material over the sides of the object, and means for turning opposite end portions of the sheet material over and against the ends of the object.

4. In a package forming machine, a shiftable member for receiving objects, means for operating the shiftable member to place the objects on the sheet material in which the objects are to be wrapped, means for folding the sheet material over the sides of the objects, means for turning opposite end portions of the sheet material over and against the ends of the object, and means for bending end portions of the sides of the sheet material and inserting the ends of the last named portions between the sides of the folded sheet material and the object.

5. In a package forming machine, a shiftable member for receiving an object rolled in sheet material and having means for folding side end portions of the sheet material over and against the ends of the object, a swinging member having fingers for folding opposite side end portions over and against the ends of the object, means for causing the said shiftable member to shift the object to the last named member and over a second sheet material, a plunger having fingers for folding the top side end portions of the first named sheet material over the ends of the object, and means for folding the second named sheet material over the ends of the object, and means for folding end portions of the sides of the second sheet material over the ends of the object.

6. In a package forming machine, a shiftable member having fingers for receiving and folding the end portions of the side of a sheet material in which the object is rolled against the ends of the object, a second member having fingers for folding opposite side end portions of the sheet material against the ends of the object, means for causing the first named member to shift the object against the second named member and over a second sheet material, a third member having fingers for folding end portions of the side of the first named sheet material over the ends of the object, means for folding the second named sheet material around the object, and means for closing opposite side end portions of the second sheet material over the ends of the object.

7. In a package forming machine, a shiftable member for receiving an object rolled in sheet material and having means for folding side end portions of the sheet material over and against the ends of the object, a swinging member having fingers for folding opposite side end portions over and against the ends of the object, means for causing the said shiftable members to shift the object to the last named member and over a second sheet material, a plunger having fingers for folding the top side end portions of the first named sheet material over the ends of the object, means for folding the second named sheet material over the ends of the object, means for folding end portions of the sides of the second sheet material over the ends of the object, and means for bending side portions of the ends of the second sheet material and inserting the ends of the last named portions between the sides of the folded second named sheet material and the sides of the object.

8. In a package forming machine, a pair of rollers and a plunger, means for shifting a carton blank to a point between the rollers on one side and the plunger on the other, a member for shifting the object to be enclosed in the carton to a point beneath the plunger, means for operating the plunger to force the object and the carton blank down between the rollers to fold portions of the carton against the sides of the object, means for operating the rollers in sequence to fold portions of the carton over the object, an end flap folding means, and fingers yieldingly carried by said means and operable during a folding operation thereof to engage edge portions of the end flap and direct them between the sides of the carton and the sides of the object.

9. In a package forming machine, a pair of rollers and a plunger, means for shifting a carton blank to a point between the rollers on one side and the plunger on the other, a member for shifting the object to be enclosed in the carton to a point beneath the plunger, means for operating the plunger to force the object and the carton blank down between the rollers to fold portions of the carton against the sides of the object, means for operating the rollers in sequence to fold portions of the carton over the object, and means operable to fold the end portions of the carton against the ends of the object and including fingers for engaging edge portions of the ends during the folding operations and directing them between the sides of the folded carton and the sides of the object.

10. In a machine for enclosing an object in a carton, a plunger and a pair of rollers, means for operating the plunger and rollers in succession to force the object and the carton blank between the rollers and to fold portions of the carton about the object, means for folding end portions of the sides of the carton over the ends of the object in succession, and means for directing ends of certain of the side portions between the sides of the folded carton and the sides of the object.

11. In a machine of the class described, a frame, initial feeding means operable to successively feed blank sheets at predetermined intervals a distance over said frame and then to permit them to rest on the frame, means engaging the top side only of the sheets and automatically operable to successively advance the sheets a predetermined distance on the frame from the rest position, a further means automatically operable to engage each sheet after being fed forward by the second feeding means and advance it to operative position relative to the frame, and means automatically operable to impart a predetermined fold to an edge portion of the blank when in rest position.

12. In a machine of the class described, means for holding an article with a carton blank wrapped therearound, and a reciprocally movable member operable to simultaneously act on flaps at opposite edges of an end of the carton to fold them inward against the article end and then to recede from the carton longitudinally thereof.

13. In a machine of the class described, means for holding an article with a carton wrapped therearound, and means having a swinging folding member operable to move the member to simultaneously act on opposed end flaps of the carton at the same end thereof to fold the same inwardly against the article end and then to swing outward from the carton end longitudinally thereof.

14. In a machine of the class described, means for holding an article with a carton wrapped around the same, a movable fold member having a curved portion for simultaneously acting on opposite end flaps of the carton at the same end thereof to fold them inwardly against the article end, and means operable to impart rocking folding and retracting movements to the member.

15. In a machine of the class described, means for holding an article with a carton wrapped therearound, a fold member having portions curved in one direction and relatively angled in another direction for simultaneously acting on opposed edge flaps of the carton at an end therof to fold them inwardly against the article end one over the other, and means for imparting flap folding and retracting movements to the fold member.

16. In a machine of the class described, means for holding an article with a carton wrapped therearound, a swingingly mounted fold plate having a pair of longitudinally curved fingers projecting from its outer end and relatively angled in a transverse plane to adapt them, upon an inward swinging of the plate, to simultaneously act on opposite edge flaps of the carton at the same end thereof and fold them inwardly against the article end one in advance of the other, and means operable to impart folding and retracting movements to the fold plate longitudinally of the carton.

17. In a machine of the class described, means for holding an article with a carton wrapped therearound, and means having fold members at opposite ends of the article and operable to simultaneously act on opposed end flaps of the carton at the respective ends thereof to fold them inwardly against the article ends, the movement of said members being toward and away from the carton ends longitudinally thereof.

18. In a machine of the class described, means for holding an article with a carton wrapped therearound, means operable to fold certain end flaps of the carton inward against the ends of the article and then to release the same, and means having holding fingers operable to move the fingers into holding engagement with the folded end flaps to prevent an unfolding of the same during subsequent operations on the carton and then to move to release the end flaps.

19. In a machine of the class described, means for holding an article with a carton wrapped therearound, means operable to fold certain flaps at an end of the carton inward against the article end, means operable to temporarily hold the folded flaps in folded position, and swinging means operable to act on an outer end flap to fold it over the previously folded flaps and insert an end thereof into the carton.

20. In a machine of the class described, means for holding an article with a carton wrapped therearound, means automatically operable to fold certain flaps at an end of the carton inward against the article end, and means automatically operable to fold a main closing flap over the folded flaps and to insert an end portion thereof into the carton at a side of the article.

21. In a machine of the class described, means for holding an article with a carton wrapped therearound, means automatically operable to fold certain flaps at an end of the carton inward against the article end, means automatically operable to fold a main closing flap over the folded flaps and to insert an end portion thereof into the carton at a side of the article, and means having a part automatically operable to move into holding engagement with the first folded end flaps to hold them in folded position during a portion of the folding movement of the closing flap and then to release the end flaps.

22. In a machine of the class described, means for holding an article with a carton wrapper therearound, a hinged member operable to move an outer end closing flap of the carton to closed position and to force the end insertion tongue thereof into the carton at a side of the article, a curved finger yieldingly carried by the member in angled relation thereto for acting on the end tongue of the flap to bend it to inserting position during the closing movement of the flap, and means assisting in guiding the end tongue into the carton.

23. In a machine of the class described, means for holding an article with a carton wrapper therearound, a hinged member operable to move an outer end closing flap of the carton to closed position and to force the end insertion tongue thereof into the carton at a side of the article, a curved finger yieldingly carried by the member in angled relation thereto for acting on the end tongue of the flap to bend it to inserting position during the closing movement of the flap, means assisting in guiding the end tongue into the carton, and means automatically operable to periodically impart folding and retracting movements to the member.

24. In a machine of the class described, means for holding an article with a carton partially folded therearound, means for imparting a final folding operation to the carton, and means automatically operable during said folding operation to effect an opening of the holding means to permit a lowering of a folded carton and its article therein.

25. In a machine of the class described, means for holding an article with a carton partially folded therearound, separate means for imparting successive folding operations to the carton while so held, and means automatically operable during a predetermined folding operation to effect an opening of the holding means to permit a lowering of a folded carton and its article therein.

26. In a machine of the class described, a chute for holding a plurality of articles with a carton partially wrapped therearound and having side portions at its lower end which are movable to drop the lowermost article therefrom, yielding means for holding the next article in order during the opening and closing movements of the side portions, mechanism for acting on the carton in closing the uppermost article to perform predetermined folding operations on the carton and operable to effect an opening of said side portions of the holding means during a predetermined folding operation.

27. In a machine of the class described, a chute for holding an article with a carton partially wrapped therearound, means for acting on the held carton to fold its inner end flaps against the article, means for acting on the held carton to feed its outer end flap against the inner folded end flaps and to tuck the end edge tongues of the 'outer end flaps into the carton, and means operable during an operation of the outer end flap folding means to effect an opening of the holding means to permit the lowering of a folded carton and its article therein.

In testimony whereof I have hereunto subscribed my name to this specification.

FRANK E. BEAM.